United States Patent
Fortino et al.

(10) Patent No.: US 9,940,097 B1
(45) Date of Patent: Apr. 10, 2018

(54) REGISTERED FIFO

(71) Applicant: Netronome Systems, Inc., Santa Clara, CA (US)

(72) Inventors: Ronald N. Fortino, North Andover, MA (US); Gavin J. Stark, Cambridge (GB); Steven W. Zagorianakos, Brookline, NH (US)

(73) Assignee: Netronome Systems, Inc., Santa Clara, CA (US)

( * ) Notice: Subject to any disclaimer, the term of this patent is extended or adjusted under 35 U.S.C. 154(b) by 585 days.

(21) Appl. No.: 14/527,550

(22) Filed: Oct. 29, 2014

(51) Int. Cl.
| | |
|---|---|
| *G06F 3/00* | (2006.01) |
| *G06F 5/00* | (2006.01) |
| *G06F 5/14* | (2006.01) |
| *H04L 25/00* | (2006.01) |
| *G06F 13/40* | (2006.01) |
| *G06F 9/34* | (2018.01) |
| *H04B 1/38* | (2015.01) |

(52) U.S. Cl.
CPC ............... *G06F 5/14* (2013.01); *H04L 25/00* (2013.01); *G06F 9/34* (2013.01); *G06F 13/40* (2013.01); *G06F 2205/126* (2013.01); *H04B 1/38* (2013.01)

(58) Field of Classification Search
CPC . H04L 47/6245; H04L 49/9078; H04L 25/00; G06F 9/34; G06F 13/40; H04B 1/38
USPC ......................................... 710/52, 53, 56–58
See application file for complete search history.

(56) References Cited

U.S. PATENT DOCUMENTS

| | | | | |
|---|---|---|---|---|
| 6,389,490 | B1* | 5/2002 | Camilleri ................... | G06F 5/12 365/189.07 |
| 7,287,105 | B1* | 10/2007 | Owen ....................... | G06F 1/12 365/189.08 |
| 7,366,943 | B1* | 4/2008 | Owen ....................... | G06F 5/10 710/58 |
| 2002/0100032 | A1* | 7/2002 | Metzgen ............. | G06F 17/5045 717/154 |
| 2003/0052708 | A1* | 3/2003 | Momtaz .................... | G06F 5/10 326/37 |
| 2005/0080842 | A1* | 4/2005 | Takeuchi .............. | G06F 13/385 709/200 |

* cited by examiner

*Primary Examiner* — Farley Abad
*Assistant Examiner* — Getente A Yimer
(74) *Attorney, Agent, or Firm* — Imperium Patent Works; T. Lester Wallace; Amir V. Adibi

(57) ABSTRACT

A registered synchronous FIFO has a tail register, internal registers, and a head register. The FIFO cannot be pushed if it is full and cannot be popped if it is empty, but otherwise can be pushed and/or popped. Within the FIFO, the internal signal fanout of incoming data circuitry and push control circuitry and is minimized and remains essentially constant regardless of the number of registers of the FIFO. The output delay of the output data also is essentially constant regardless of the number of registers of the FIFO. An incoming data value can only be written into the head or tail. If a data value is in the tail and one of the internal registers is empty, and if no push or pop is to be performed in a clock cycle, then nevertheless the data value in the tail is moved into the empty internal register in the cycle.

20 Claims, 9 Drawing Sheets

REGISTERED FIFO

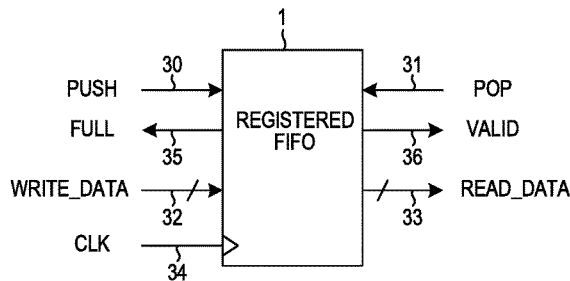

REGISTERED FIFO

FIG. 1

| |
|---|
| INCOMING WRITE_DATA IS CAPTURED IN ANY SINGLE CLOCK CYCLE WHERE "PUSH" IS ASSERTED AND "FULL" IS NOT ASSERTED. |
| INCOMING WRITE_DATA CAN ONLY BE CAPTURED DIRECTLY INTO THE HEAD AND TAIL REGISTERS. INCOMING WRITE_DATA CANNOT BE CAPTURED DIRECTLY INTO ANY INTERNAL REGISTER. |
| STARTING WITH AN EMPTY FIFO, WRITE_DATA THAT IS "PUSHED" IN ONE CLOCK CYCLE WILL APPEAR ON THE READ_DATA OUTPUT IN THE VERY NEXT CLOCK CYCLE. |
| "FULL" IS ASSERTED IN THE VERY NEXT CLOCK CYCLE FOLLOWING THE PUSH OF THE WRITE_DATA THAT MADE THE FIFO FULL. |
| ONCE FULL, "FULL" WILL BE DE-ASSERTED IN THE VERY NEXT CLOCK CYCLE FOLLOWING A SINGLE CLOCK CYCLE IN WHICH "POP" IS ASSERTED AND "VALID" IS ASSERTED. |
| IF "POP" IS ASSERTED, THEN THE CONTENT OF THE HEAD REGISTER IS UPDATED FOR THE NEXT CLOCK CYCLE IF THERE IS ANOTHER DATA VALUE STORED IN THE FIFO. |
| IF "VALID" IS ASSERTED, THEN READ_DATA IS OUTPUT FROM THE FIFO AND IS VALID ON THE NEXT RISING CLOCK EDGE. |
| FIFO OUTPUT READ_DATA ALWAYS COMES DIRECTLY FROM THE HEAD REGISTER - THERE IS NO OUTPUT MULTIPLEXER THAT MULTIPLEXES ONE OF MANY REGISTER VALUES ONTO THE FIFO READ_DATA OUTPUTS. |
| THE "PUSH" SIGNAL ONLY DIRECTLY CONTROLS OPERATION OF THE HEAD AND TAIL REGISTERS. OPERATION OF THE INTERNAL REGISTERS IS INDEPENDENT OF THE "PUSH" SIGNAL. |
| IF NEITHER OF THE "PUSH" AND "POP" SIGNALS IS ASSERTED AND THE TAIL IS OCCUPIED AND ONE OF THE INTERNAL REGISTERS IS UNOCCUPIED, THEN IN THE NEXT CLOCK CYCLE THE CONTENT OF THE TAIL IS TRANSFERRED INTO THE UNOCCUPIED INTERNAL REGISTER. |
| THE FIFO CANNOT BE PUSHED IF "FULL" IS ASSERTED, AND CANNOT BE "POPPED" IF IT IS EMPTY (WRITE POINTER IS ZERO), BUT OTHER THAN THAT THE FIFO CAN BE PUSHED AND/OR POPPED AT ANY TIME. |

CHARACTERISTICS OF THE REGISTERED FIFO

FIG. 2

PUSH AND POP IN SAME CYCLE

PUSHING OR POPPING EVERY CYCLE

PUSH AND POP IN SAME CYCLE

PUSH AND POP IN SAME CYCLE

```
100   module new_fifo_arch ( clock clk,
101                  input bit logic_reset_n,
102                  input bit push "Push single data word into FIFO",
103                  input gt_fifo_data write_data "Push data word into FIFO",
104                  input bit pop "Pop single data word from FIFO",
105                  output gt_fifo_data read_data "Popped data word from FIFO",
106                  output bit valid "FIFO is not empty or FIFO has valid data",
107                  output bit full  "FIFO is full",
108                  )
109
110   {
111   clocked gt_fifo_data [5] fifo_array = { *=0 } "FIFO Data Word";
112   clocked bit valid = 0;
113   clocked bit full = 0;
114   clocked bit tail_valid = 0;
115   clocked bit[3] write_pointer = 0;
116   clocked bit[3] wp = 1;
117   clocked bit[3] rp = 1;
118
119   fifo_logic "": {
120      // read_data
121      read_data = fifo_array[0];
122
123      // valid
124      if(pop && valid && push && !full) {
125          valid <= valid;
126      } elsif(pop && valid) {
127          valid <= (write_pointer != 1)
128      } elsif(push && !full) {
129          valid <= 1;
130      } else {
131          valid <= valid;
132      }
```

HARDWARE LANGUAGE DESCRIPTION OF THE
REGISTERED FIFO

FIG. 8A

```
133    // full
134    if(pop && valid && push && !full) {
135        full <= full;
136    } elsif(pop && valid) {
137        full <= 0;
138    } elsif(push && !full) {
139        full <= (write_pointer == 4);
140    } else {
141        full <= full;
142    }
143
144    // write_pointer
145    if(pop && valid && push && !full) {
146        write_pointer <= write_pointer;
147    } elsif(pop && valid) {
148        write_pointer <= write_pointer - 1;
149    } elsif(push && !full) {
150        write_pointer <= write_pointer + 1;
151    } else {
152        write_pointer <= write_pointer;
153    }
154
155    // tail_valid
156    if(pop && valid && push && !full) {
157        tail_valid <= (write_pointer != 1);
158    } elsif(pop && valid) {
159        tail_valid <= 0
160    } elsif(push && !full) {
161        tail_valid <= (write_pointer != 0);
162    } else {
163        tail_valid <= tail_valid;
164    }
```

HARDWARE LANGUAGE DESCRIPTION OF THE
REGISTERED FIFO

FIG. 8B

```
165    // wp
166        if(tail_valid && !full && !(pop && valid && (write_pointer == 2))) {
167            if(wp == 3) {
168                wp <= 1;
169            } else {
170                wp <= wp + 1;
171            }
172        } else {
173            wp <= wp;
174
175        // rp
176        if(pop && valid && !(tail_valid && (write_pointer == 2))) {
177            if(rp == 3) {
178                rp <= 1;
179            } else {
180                rp <= rp + 1;
181            }
182        } else {
183            rp <= rp;
184        }
```

HARDWARE LANGUAGE DESCRIPTION OF THE
REGISTERED FIFO

FIG. 8C

```
185    // head - fifo_array[0]
186        if(pop && valid && push && !full) {
187            if(write_pointer == 1) {
188                fifo_array[0] <= write_data;
189            } elsif(write_pointer == 2) {
190                fifo_array[0] <= fifo_array[4];
191            } else {
192                fifo_array[0] <= fifo_array[rp];
193            }
194        } elsif (pop && valid) {
195            if(tail_valid && (write_pointer == 2)) {
196                fifo_array[0] <= fifo_array[4];
197            } elsif (write_pointer != 1) {
198                fifo_array[0] <= fifo_array[rp];
199            }
200        } elsif (push && !full) {
201            if(write_pointer == 0) {
202                fifo_array[0] <= write_data;
203            }
204        }
205
206    // tail - fifo_array[4]
207        if(pop && valid && push && !full) {
208            if(write_pointer != 1) {
209                fifo_array[4] <= write_data;
210            }
211        } elsif (push &&!full) {
212            if(write_pointer != 0) {
213                fifo_array[4] <= write_data;
214            }
215        }
216
217    // A,B,C Entries - fifo_array[3:1]
218        if(tail_valid && !full) {
219            fifo_array[wp] <= fifo_array[4];
220        }
221    }
222 }
```

HARDWARE LANGUAGE DESCRIPTION OF THE
REGISTERED FIFO

FIG. 8D

REGISTERED FIFO

TECHNICAL FIELD

The described embodiments relate generally to FIFO (First In First Out) memories, and to related methods and structures.

BACKGROUND INFORMATION

A FIFO (First In First Out) memory, referred to here as a synchronous FIFO, is a FIFO whose data input and data output ports both operate synchronously using the same clock signal. The synchronous FIFO memory is usually referred to just simply as a "synchronous FIFO". Such a synchronous FIFO generally receives a push control signal and an input data value on its data input port. If the push signal is adequately set up on a push signal input lead of the FIFO, and if the data value is adequately set up on a set of data input leads of the FIFO, then on the next rising edge of the clock signal the data value is captured into the FIFO. This operation is referred to as pushing. The external circuit that supplies the push signal to the FIFO and that supplies the data value to the FIFO is generally being clocked synchronously by the same clock signal. The external circuit initiates the assertion of the push signal and the supplying of the data value to the FIFO in response to a rising edge of the clock signal at the beginning of a prior clock cycle, so the external circuitry must therefore be fast enough to supply the push and data input values to the FIFO input port in less than one clock cycle so that the push and data value signals are present on the input port in adequate time before the next rising edge of the same clock signal. If the setup time requirements of the FIFO are large, then there is only a relatively smaller amount of time available for the external circuitry to supply the push and data values. This is undesirable and limits overall circuit operating speed.

Similarly, from the perspective of the output port of the FIFO, there is also external circuitry that launches the pop signal and that receives the data value from the FIFO in return. This external circuitry generally initiates the assertion of the pop signal in response to a rising edge of the clock signal. Moreover, the external circuitry is clocked by the clock signal and may need to capture the resulting data value as output by the FIFO upon the next rising edge of the clock signal. If signal propagation delays within the FIFO are such that the pop signal has relatively large setup time requirements, then relatively less time is left for the external circuitry to supply to pop signal to the FIFO. In addition, if signal propagation delays within the FIFO are such that it takes the FIFO a relatively large amount of time to output the data value following the initiating rising edge of the clock signal, then relatively less time is available for the external circuitry to conduct the data value from the FIFO to the external latch or register before the next rising edge of the clock signal occurs. If the pop setup time of the FIFO is large and/or if the clock-to-data output propagation delay of the FIFO is large, then the operating speed of the overall circuit may be undesirably low.

SUMMARY

A synchronous FIFO includes a push signal input lead, a pop signal input lead, a full signal output lead, a valid signal output lead, a set of input data leads, a set of output data leads, a tail register, a head register, a plurality of internal registers, and a control circuit. The control circuit controls the head register, the internal registers, and the tail register such that: 1) an incoming data value that is pushed into the FIFO can only be written directly into either the head register or the tail register and can never be written directly from the set of input data leads into any of the internal registers; 2) only a data value stored in the head register is ever output from the FIFO memory onto the set of output data leads; 3) if during a clock cycle the tail register stores a data value and at least one of the internal registers is empty and no push operation is to be performed by the FIFO in the next clock cycle and no pop operation is to be performed by the FIFO in the next clock cycle then in the next clock cycle the data value stored in the tail register is loaded into an empty one of the internal registers; 4) an incoming data value on the set of input data leads is captured into the FIFO on a rising edge of the clock signal if a push signal on the push signal input lead is asserted at the time of the rising edge provided that a full signal on the full signal output lead is not asserted at the time of the rising edge; 5) if the FIFO memory is empty in one clock cycle and if the FIFO memory then performs a push operation in the next clock cycle then an incoming data value from the set of input data leads is written directly into the head register in said next clock cycle (there is no output multiplexer that supplies data values onto the output data leads, and that has inputs coupled to multiple one of the registers—rather, the data output leads of the head register is coupled directly to the set of output data leads of the FIFO); 6) a data value can be simultaneously pushed into the FIFO at the same time that the FIFO is popped on a rising edge of the clock signal provided that a valid signal on the valid signal output lead is asserted at the time of the rising edge and provided that a full signal on the full signal output lead is not asserted at the time of the rising edge; and 7) the FIFO cannot be pushed if it is full and cannot be popped if it is empty, but other than that the FIFO can be pushed and/or popped on any rising edge of the clock signal.

In one example, the control circuit includes an internal write pointer register and an internal read pointer register. The internal write pointer register maintains and outputs a value WP that indicates the next one of the internal registers into which a data value will be loaded. The internal read pointer register maintains and outputs a value RP that indicates the next one of the internal registers from which a data value will be transferred into the head register. The control circuit further includes a write pointer register that maintain a multi-bit value that indicates the number of valid data values that are stored in the FIFO. The control circuit further includes a tail_valid flip-flop whose output signal indicates whether the tail register is storing a valid data value. The control circuit further includes a valid flip-flop whose output signal indicates whether the head register is outputting onto the set of output data leads a valid data value. The control circuit further includes a full flip-flop whose output signal indicates whether all the data registers (the tail, head, and internal registers) are currently storing valid data values.

Further details and embodiments and methods and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 1 is a diagram of a symbol of a novel registered FIFO memory.

FIG. 2 is a table that sets forth characteristics of the registered FIFO memory of FIG. 1.

FIG. 8A is a first part of a larger diagram of FIG. 8, where FIG. 8 is a listing of an amount of hardware description language for the registered FIFO memory of FIG. 1.

FIG. 8B is a second part of the larger diagram of FIG. 8.

FIG. 8C is a third part of the larger diagram of FIG. 8.

FIG. 8D is a fourth part of the larger diagram of FIG. 8.

DETAILED DESCRIPTION

Figure 3:
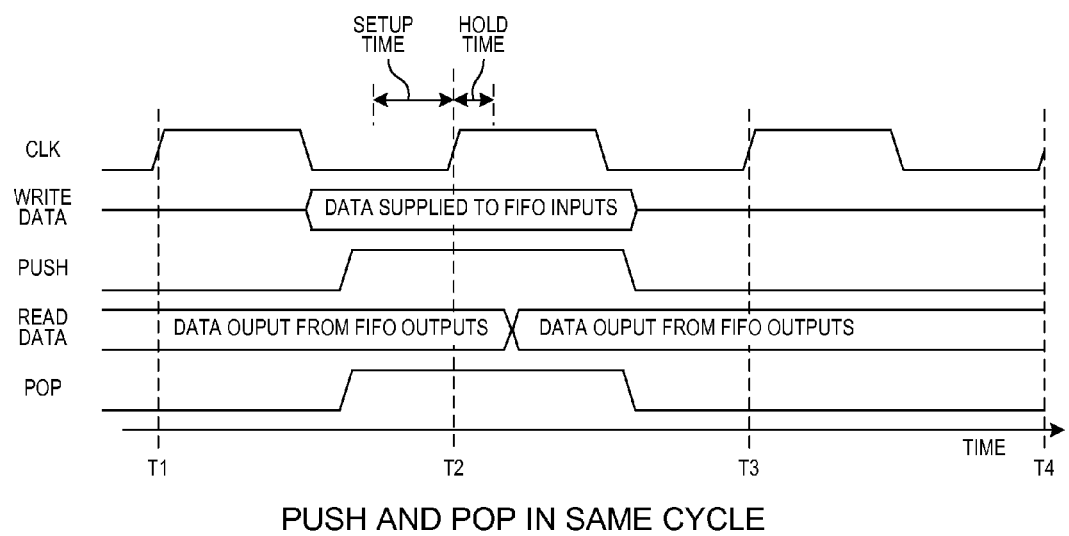
FIG. 3 is a simplified waveform diagram that illustrates one example of how the FIFO memory of FIG. 1 can be pushed and popped in the same clock cycle.

Reference will now be made in detail to background examples and some embodiments of the invention, examples of which are illustrated in the accompanying drawings.

FIG. 1 is a diagram of a symbol of a novel registered FIFO (First In First Out) memory 1. The FIFO 1 is a synchronous FIFO in that the incoming control signals PUSH and POP must be setup with respect to the same clock signal CLK. Data values are captured into, or are "pushed" into, the FIFO on rising edges of the clock signal CLK. The PUSH, POP and WRITE_DATA signals therefore must meet setup and hold time requirements with respect to the same clock signal CLK. The data values output from the FIFO are caused to be changed, or are "popped", synchronous with rising edges of the clock signal CLK.

FIG. 2 is a table that sets forth characteristics of the registered FIFO memory 1 of FIG. 1. The characteristics are not necessarily logically exclusive, but rather are set forth in an textually descriptive manner. First characteristic: the FIFO has a tail register, internal registers, and a head register. Second characteristic: incoming write data is captured into the FIFO in any clock cycle where the PUSH signal is asserted on the rising edge of CLK at the beginning of the cycle provided that the FULL signal is not asserted (at the time of the rising edge of CLK at the beginning of the clock cycle). Incoming write data can only be captured directly into the head and tail registers. In a conventional FIFO architecture the incoming data value can be loaded into any of the FIFO registers depending on current usage, and this capability requires fanout circuitry that supplies the incoming data value to one of many receiving registers. If the conventional FIFO has a great many registers, then the fanout circuitry is large and propagation delay through the large fanout circuitry is also large, and this limited FIFO operating speed. In the novel registered FIFO memory 1, on the other hand, this potentially large and slow fanout circuitry is not necessary and is not included. Third characteristic: assuming an empty FIFO as a starting condition, incoming write data that is pushed into the FIFO in one clock cycle will appear on the READ_DATA outputs in the very next clock cycle. Fourth characteristic: the FULL signal is asserted in the very next clock cycle following the push of write data that made the FIFO full. Fifth characteristic: once full, the FULL signal will be de-asserted in the very next clock cycle following a single clock cycle in which the POP signal is asserted and the VALID signal is asserted. Sixth characteristic: if the POP signal is asserted, then the content of the head register is updated for the next clock cycle if there is another data value stored in the FIFO. Seventh characteristic: if the VALID signal is asserted, then READ_DATA is output from the FIFO and is valid on the next rising edge of the clock signal. Eighth characteristic: FIFO output data always comes directly from the head register. There is no output multiplexer that multiplexes one of many register values onto the FIFO output signal lines. In a conventional FIFO, the contents of any one of the registers of the FIFO can be supplied onto the data output lines of the FIFO, depending on current register usage and which register stores the oldest data value. This in turn requires output multiplexing circuitry that is capable of directing the data value from any one of many registers onto on set of data output lines. This output multiplexer circuitry is large, and therefor propagation delay through it can be large, and FIFO performance operating speed can be limited. In the novel registered FIFO memory 1, on the other hand, there is no output multiplexer or multiplexing circuitry. Ninth characteristic: the PUSH signal only controls the head and tail registers in that operation of the internal registers is independent of the PUSH signal. In a conventional FIFO, the push signal must fanout to control the gating and loading of each register of the FIFO. If the number of registers in the FIFO is large, the delay is propagation delay through this large amount of fanout circuitry reduces the amount of time available to circuitry outside the FIFO to supply the push signal to the FIFO with adequate setup time to the rising edge of the clock signal. In the novel registered FIFO memory 1, on the other hand, the push signal does not control operation of the internal registers, but rather only head and tail register operation is directly affected by the push signal. Signal propagation delays through the push signal path are therefore reduced as compared to propagation delays through the large push signal fanout circuitry in the conventional FIFO architecture. Tenth characteristic: if neither of the PUSH and POP signals is asserted and the tail is occupied and one of the internal registers is unoccupied, then in the next clock cycle the contents of the tail is transferred into the unoccupied internal register. Eleventh characteristic: the FIFO cannot be pushed if the FULL signal is asserted, and cannot be popped if it is empty (if the head register is empty as indicated by VALID not being asserted), but other than that the FIFO can be pushed and/or popped on any rising edge of the clock signal.

FIG. 3 is a simplified waveform diagram that illustrates one example of how the FIFO memory of FIG. 1 can be pushed and popped in the same clock cycle. Due to the PUSH signal being asserted with adequate setup time to the rising edge of the clock signal CLK at time T2, the data value present on the WRITE DATA input leads 32 (with adequate setup time to the rising edge of the clock signal CLK at time T2) is loaded into a register of the FIFO starting at time T2. In addition, in the example illustrated, the POP signal is also asserted with adequate setup time to the same rising edge of the clock signal CLK at time T2. Accordingly, in response to the rising edge of the clock signal CLK at time T2, the content of the head register (as it being output from the FIFO on the data output leads of the FIFO) is changed to be the next oldest data value stored in the FIFO. In one advantageous aspect, the FIFO memory has no output multiplexer, so the change of the data output of the FIFO memory occurs relatively quickly following the T2 rising edge that caused the change. In another advantageous aspect, due to the FIFO memory only begin pushable into its head and tail registers, the amount of circuitry involved in using the PUSH signal to control registers is relatively small and consequently the setup time required for the PUSH signal to be received onto the FIFO memory relative to the rising edge of the clock signal is relatively small. In the diagram of FIG. 3, the setup time required for the PUSH signal is substantially less than one half of the period of the clock signal CLK.

Figure 4:
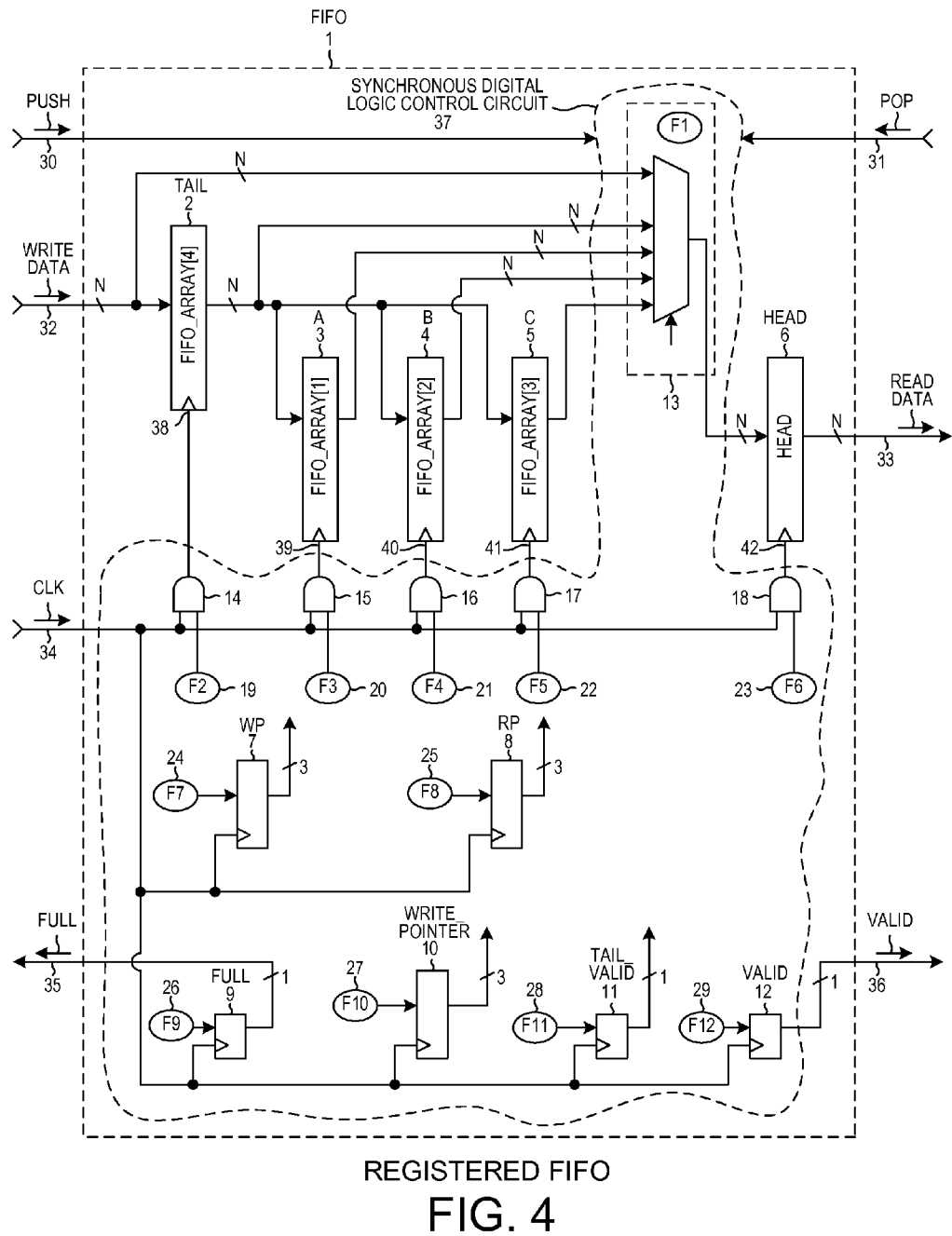
FIG. 4 is a more detailed block diagram of the registered FIFO memory of FIG. 1.

FIG. 4 is a more detailed block diagram of the registered FIFO memory 1 of FIG. 1. FIFO 1 includes a tail register (FIFO_ARRAY[4]) 2, a first internal register A (FIFO_ARRAY[1]) 3, a second internal register B (FIFO_ARRAY[2]) 4, a third internal register C (FIFO_ARRAY[3]) 5, a head register (FIFO_ARRAY[0]) 6, a synchronous digital logic control circuit 37, the push signal input lead PUSH 30, the pop signal input lead POP 31, the write data input leads WRITE DATA 32, the read data output leads READ DATA 33, the clock signal input lead CLK 34, the full signal output lead FULL 35, and the valid signal output lead VALID 36. The synchronous digital logic control circuit 37 includes an internal write pointer register WP 7, an internal read pointer register RP 8, a full flip-flop FULL 9, a write pointer register WRITE_POINTER 10, a tail valid flip-flop TAIL_VALID 11, a head valid flip-flop VALID 12, a multiplexing circuit F1 13, a plurality of clock gating gates 14-18, and signal generating circuits F2-F12 19-29.

Each of the signal generating circuits generates an input signal to a corresponding one of the sequential logic elements (the corresponding flip-flop or register) as a function of the inputs signals to the FIFO and as a function of the outputs values of the various sequential logic elements (registers and flip-flops) of the FIFO. The F9 signal generating circuit 26, for example, generates a single bit signal that is supplied onto the data input lead of the FULL flip-flop 9, where this single bit signal that is generated by the F9 circuit is a function of the input signals to the FIFO and is also a function of the output values of the sequential logic elements of the FIFO. Via clock-gating digital logic AND gates 14-18, the signal generating circuits F2-F6 supply gated clock signals onto the clock signal input leads 38-42 of the registers so that each respective one of the registers is clocked to latch in data at the appropriate times so that the desired overall functions set forth in FIG. 2 are carried out. Although an example of a registered FIFO is presented here that has three internal registers A, B and C, the architecture being disclosed is extendable to have other numbers of internal registers.

The write pointer register 10 is a three-bit register that maintains a three-bit value that indicates the number of the five registers (tail, A, B, C and head) that are storing data values. If none of these five registers is storing a data value, then the three-bit write pointer register 10 contains a "000" value. The value WRITE_POINTER can therefore have a value of from "000" (zero) to "101" (five).

The FULL flip-flop 9 stores a one-bit value that indicates whether each of the registers (tail, A, B, C and head) is storing a data value, i.e. all of the registers of the FIFO are "full". If the flip-flop is storing a "1" value, then all five of the registers (tail, A, B, C and head) are storing data values. If the flip-flop is storing a "0", then at least one of the five registers is empty. The term "empty" here means not storing a valid data value.

The tail valid TAIL_VALID flip-flop 11 stores a one-bit value that indicates whether the tail register is storing a data value. If the flip-flop is storing a "1", then the tail register is storing a data value. If the flip-flop is storing a "0", then the tail register is empty.

The head valid VALID flip-flop 12 stores a one-bit value that indicates whether the head register is storing a data value. If the flip-flop is storing a "1", then the tail register is storing a data value. If the flip-flop is storing a "0", then the tail register is empty.

The internal write pointer register WP 7 is a three-bit register that stores a number that points to the next one of the internal registers (register A, B or C) that can be written into next. The only possible WP values are "001", "010" and "011". A WP value of "001" indicates that the next internal register into which a data value can be written is the A register. A WP value of "010" indicates that the next internal register into which a data value can be written is the B register. A WP value of "011" indicates that the next internal register into which a data value can be written is the C register.

Of importance, the loading of the internal registers A, B and C is independent of the PUSH signal. A data value stored in the tail register is transferred out of the tail register and into an empty one of the internal registers as a result of the TAIL_VALID signal being asserted, provided that one of the internal registers is empty, and this transferring occurs irrespective of whether a push operation is going on or not. Accordingly, if the FIFO has a data value stored in its tail register and if one of the three internal registers (A, B and C) is empty, and if the PUSH signal is not asserted so no push operation is indicated to occur on the next clock cycle, nevertheless in the next clock cycle the data value from the tail register will be moved into the next indicated internal register to be written (as indicated by the WP value) even though no new data value is being pushed into the tail register. As a result of this transfer the tail register is empty so the TAIL_VALID signal will be de-asserted, and as a result of the writing into one of the internal registers the value WP is incremented.

The internal read pointer register RP 8 is a three-bit register that stores a number that points to the next one of the internal registers A, B or C from which a data value can be transferred next. The only possible RP values are "001", "010" and "011". A RP value of "001" points to the A register. A RP value of "010" points to the B register. A RP value of "011" points to the C register.

If the FIFO is not full (the "not full" condition is indicated by the FULL signal being a digital "0"), then a data value can be pushed into the FIFO. A data value can be pushed into the FIFO by: 1) supplying the new data value onto the WRITE DATA leads 32 with adequate setup time to a rising edge of the clock signal CLK, and 2) asserting the PUSH signal on the push input lead 30 also to with adequate setup time to the rising edge of the clock signal. In response to the rising edge of the clock signal, the data value is loaded into one of the registers of the FIFO.

If the FIFO is not empty (the not empty condition is indicated by the VALID signal being asserted), then the FIFO can be popped. The FIFO can be popped asserting the POP signal on the pop input lead 31 with adequate setup time to a rising edge of the clock signal CLK. In response to the rising edge of the clock signal, the data value stored in the head register is changed to be the next oldest data value stored in the FIFO.

Figure 5:
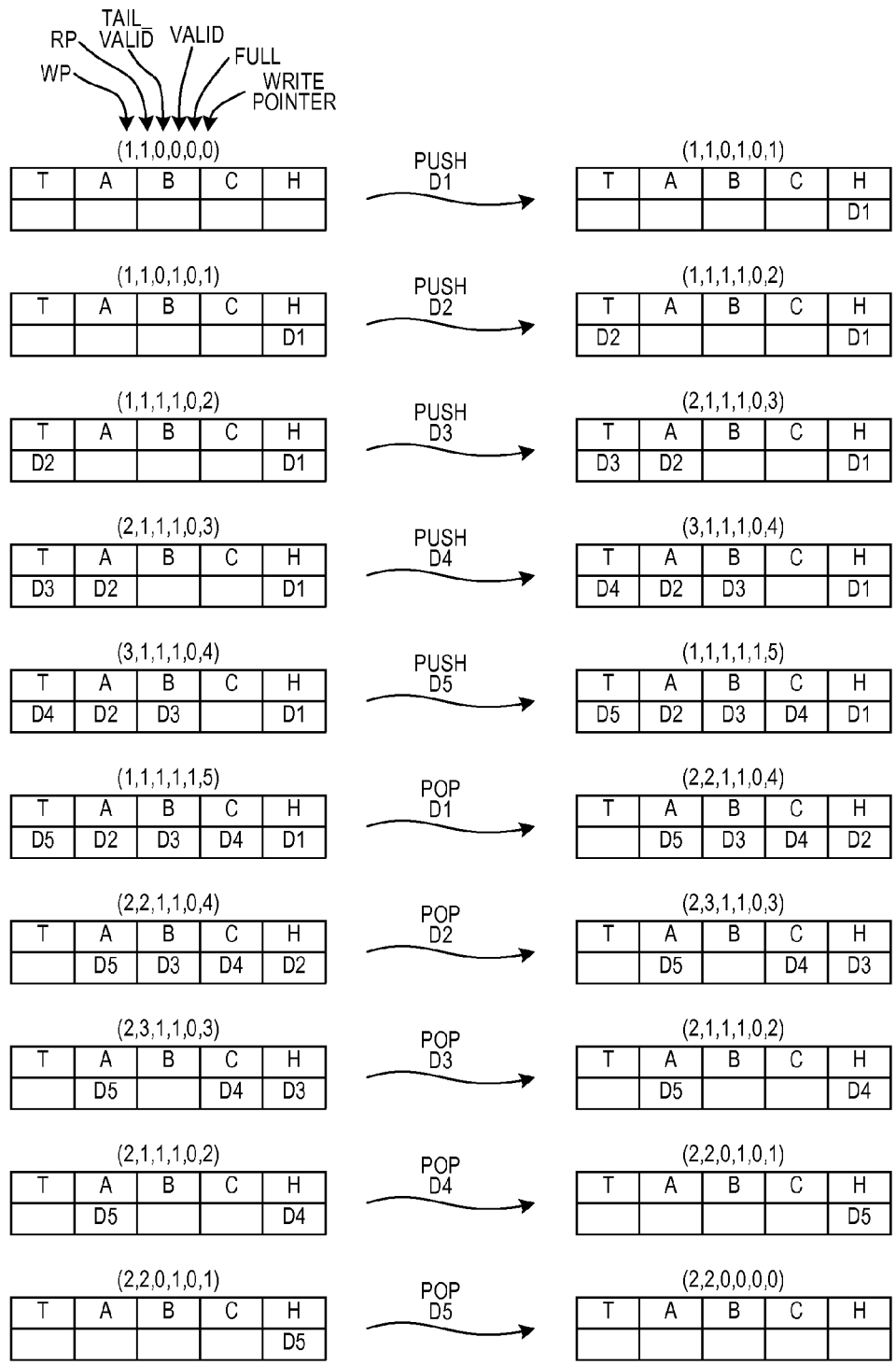
FIG. 5 is a diagram that illustrates one particular exemplary sequence of pushing data values into the FIFO memory of FIG. 1 and of popping data values out of the FIFO memory of FIG. 1.

FIG. 5 is a diagram that illustrates one particular exemplary sequence of pushing data values into the FIFO memory of FIG. 1 and of popping data values out of the FIFO memory of FIG. 1. The initial state of the FIFO in this example is set forth in the upper left of the diagram. The five registers are all empty as indicated by the empty boxes labeled "T", "A", "B", "C", and "H". Because zero of the five registers is storing a value, the WRITE POINTER value is "000". Because the FIFO is not full, the FULL signal is not asserted. Because there is no data value stored in the FIFO and there is no valid data value being output from the FIFO, the VALID signal is not asserted. Because the tail register is empty, the TAIL_VALID signal is not asserted. Because none of the internal registers has been read yet or written yet, the RP and WP values are both "01" (pointing to the first of the three internal registers).

The PUSH signal is then asserted on input lead 30 and a first data value D1 is supplied onto the WRITE DATA input leads 32. As a result of the push, the first data value D1 is loaded into the head register. The resulting state of the FIFO is set forth in the upper right of the diagram. The previously empty box labeled "H" on the left is now illustrated as containing "D1" on the right. The internal pointers WP and RP are not changed because no data values were loaded into any of the three internal registers A, B or C. Because the head register now stores a data value, the valid flip-flop 12 is now set so that the signal VALID is asserted.

Next, the PUSH signal is asserted on input lead 30 and a second data value D2 is supplied onto the WRITE DATA input leads 32. As a result of this push, the second data value D2 is loaded into the tail register. This state of the FIFO is set forth in the right column diagram that is in the second row down from the top of the page. The first data value D1 remains stored in the head register, but the second data value D2 is now stored in the tail register. The internal pointers WP and RP are not changed because no data values were loaded into any of the three internal registers A, B or C. Because the tail register now stores a data value, the flip-flop 11 is set so that the TAIL_VALID signal will be asserted.

Next, the PUSH signal is asserted on input lead 30 and a third data value D3 is supplied onto the WRITE DATA input leads 32. As a result of this push, the third data value D3 is loaded into the tail register, and simultaneously as a result of the TAIL_VALID signal being asserted, the prior content of the tail register (D2) is loaded in to the next internal register to be written. The next internal register to be written is as indicated by the internal WP register. Accordingly, because the WP value is "001", the register A is loaded with the prior content (D2) of the tail register. As a result of this push, the third data value D3 is stored in the tail register, the second data value D2 is stored in register A, and the first data value D1 remains stored in the head register. Every time a value is written into one of the three internal registers, the value of WP is incremented. Accordingly, as a result of the third push, the value of WP is incremented from "001" to "010". (The WP is a count that counts from "001" to "010" to "011", and then rolls over to "001" again).

Next, the PUSH signal is asserted on input lead 30 and a fourth data value D4 is supplied onto the WRITE DATA input leads 32. As a result of this push, the fourth data value D4 is loaded into the tail register, and, as a result of the TAIL_VALID signal being asserted, the prior content of the tail register is loaded in to the next internal register to be written. The next internal register to be written, as indicated by the internal WP register, is register B. Accordingly, the prior content of the tail register (the data value D3) is loaded into the register B. As a result of this push, the fourth data value D4 is stored in the tail register, the second data value D2 is stored in register A, the third data value D3 is stored in the register B, and the first data value D1 remains stored in the head register. Because WP is incremented after a write into one of the three internal registers, the value of WP is incremented from "010" to "011".

Next, the PUSH signal is asserted on input lead 30 and a fifth data value D5 is supplied onto the WRITE DATA input leads 32. As a result of this push, the fifth data value D5 is loaded into the tail register, and, as a result of the TAIL_VALID signal being asserted, the prior content of the tail register (D4) is loaded in to the next internal register to be written. The next internal register to be written, as indicated by the internal WP register value of "011", is register C. Accordingly, the prior content of the tail register (the data value D4) is loaded into the register C. As a result of this push, the fifth data value D5 is stored in the tail register, the second data value D2 is stored in register A, the third data value D3 is stored in the register B, the fourth data value D4 is stored in register C, and the first data value D1 remains stored in the head register. WP is then incremented from "011", and it rolls over to have the new value of "001". (As explained above, WP counts in the sequence "001", "010", "011", "001", "010", "011", "001", and so forth).

In response to each push, the value of WRITE_POINTER is incremented so that the WRITE_POINTER value always indicates the number of data value currently stored in the FIFO. If the WRITE_POINTER value is set to "101" (five), then the flip-flop FULL is set so that the FULL signal is asserted. Asserting of the FULL signal indicates that the FIFO is full, namely that all the five registers are storing data values.

Next, in the particular exemplary sequence of FIG. 5, the POP signal is asserted on input lead 31. In response to the next rising edge of the clock signal CLK, the next internal register to be read (as indicated by the RP value) is transferred into the head register. The RP value is initially "001", so that the content of register A (D2) is transferred into the head register. Also, as a result of the TAIL_VALID signal being asserted, the prior content of the tail register (D5) is loaded into the next internal register to be written. The next internal register to be written, as indicated by the internal WP register value of "001", is register A. As a result of this pop operation, the tail register is empty, the fifth data value D5 is stored in register A, the third data value D3 is still stored in register B, the fourth data value D4 is still stored in register C, and the second data value D2 is now stored in the head register. After one of the three internal registers A, B and C has been transferred to another register, the value of RP is incremented. RP was initially "001", so RP is incremented to be "010". Because the tail register is now empty, the TAIL_VALID flip-flop 11 is cleared so that the signal TAIL_VAILD will not be asserted.

Next, the POP signal is asserted on input lead 31. In response to the next rising edge of the clock signal CLK, the next internal register to be read (as indicated by the RP value) is transferred into the head register. The RP value is "010", so the content of register B (D3) is transferred into the head register. As a result of this second pop operation, the tail register is empty, the fifth data value D5 is still stored in register A, the register B is empty, D4 is still stored in register C, and D3 is now stored in the head register. Because one of the three internal registers A, B and C was transferred to another register, the value of RP is incremented. Accordingly, RP is incremented to "011".

Next, the POP signal is asserted on input lead 31. In response to the next rising edge of the clock signal CLK, the next internal register to be read (as indicated by the RP value) is transferred into the head register. The RP value is "011", so the content of register C (D4) is transferred into the head register. As a result of this third pop operation, the tail register is empty, the fifth data value D5 is still stored in register A, the register B is empty, the register C is empty, and D4 is now stored in the head register. Because one of the three internal registers A, B and C has been transferred to another register, the value of RP is incremented. Accordingly, RP is incremented to and rolls over to the value "010".

Next, the POP signal is asserted on input lead 31. In response to the next rising edge of the clock signal CLK, the next internal register to be read (as indicated by the RP value) is transferred into the head register. The RP value is "001", so the content of register A (D5) is transferred into the head register. As a result of this fourth pop operation, the tail register is empty, registers A, B and C are empty, and the fifth data value D5 is now stored in the head register.

Next, the POP signal is asserted on input lead 31. The tail register and the three internal registers are all empty, so in response to the next rising edge of the clock signal CLK the head register is recorded as being empty. The head register is recorded as being empty by the valid flip-flop VALID being cleared, so that the signal VALID is de-asserted.

Figure 6:
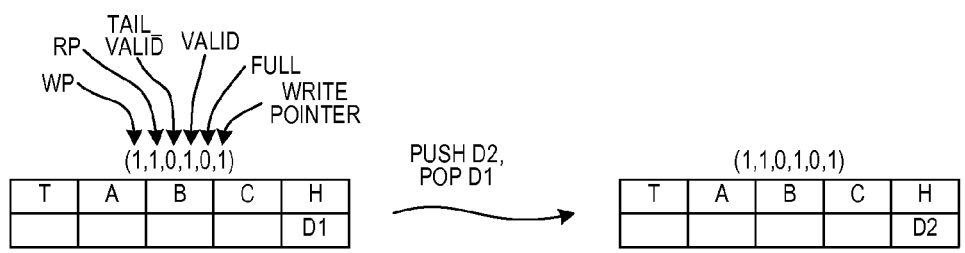
FIG. 6 is a diagram that illustrates a first example of how the FIFO memory of FIG. 1 can be made to perform simultaneous pushing and popping operations.

FIG. 6 is a diagram that illustrates a first example of how the FIFO can be made to perform simultaneous pushing and popping operations. In the illustrated example, the FIFO initially stores one data value. If the FIFO stores one data value, then this one data value is stored in the head register as illustrated on the left of the diagram. If both the PUSH input signal and the POP input signal are asserted, then new data value D2 is loaded straight into the head register so that the D2 value replaces the previous D1 value that was in the head register. The FIFO stores the same number of data values before and after the simultaneous push and pop operation. Accordingly, the WRITE POINTER has the same value after the push and pop operation that is had before the push and pop operation. The WRITE POINTER had a value of one both before and after the push and pop operation.

Figure 7:
FIG. 7 is a diagram that illustrates a second example of how the FIFO memory of FIG. 1 can be made to perform simultaneous pushing and popping operations.

FIG. 7 is a diagram that illustrates a second example of how the FIFO can be made to perform simultaneous pushing and popping operations. In the illustrated example, the FIFO initially stores two data values. If the FIFO stores two data values, then the oldest data value is stored in the head register and the other data value is stored in the tail register. If both the PUSH input signal and the POP input signal are asserted, then new data value D3 is loaded into the tail register, and the prior content of the tail register (D2) is loaded into the head register. The FIFO stores the same number of data values before and after the simultaneous push and pop operation. Note that the WRITE POINTER had a value of two before the push and pop operation, and that the WRITE POINTER had a value of two after the push and pop operation.

FIG. 8A, FIG. 8B and FIG. 8C together form a single larger FIG. 8. FIG. 8 is a listing of an amount of hardware description language for the registered FIFO memory of FIG. 1. In the code of FIG. 8, capital letters are not used, but the signal names and component names otherwise are the same as shown in FIG. 4. Each line of the listing of FIG. 8 is identified with a line number. Lines 100-107 define the inputs and outputs of the FIFO. The inputs are the single bit signals clk, logic_reset_n, push, and pop, and the multi-bit signal write_data. The outputs are the single bit signals valid and full, and the multi-bit signal read_data.

Lines 111-117 are definitions for registers and flip-flops in the FIFO, along with their initial values. The five registers of the FIFO are an array fifo_array[n], where the index goes from 0 to 4. Fifo_array[0] is the head register. Fifo_array[1] is the register A. Fifo_array[2] is the register B. Fifo_array[3] is the register C. Fifo_array[4] is the head register. The "valid" flip-flop is initially set to "0". The "full" flip-flop is initially set to "0". The "tail_valid" flip-flop is initially set to "0". The three-bit register "write_pointer" is initially set to "000". The three-bit internal register "wp" is initially set to "001". The three-bit internal register "rp" is initially set to "001".

Line 121 defines that "read_data" is the output of fifo_array[0] register. Lines 124-132 indicate how the signal "valid" should be generated. If the FIFO is being popped and pushed at the same time, as indicated by line 124, then the value of "valid" should not be changed, as indicated by line 125. Otherwise, if the FIFO is just being popped when the FIFO has something in it, as indicated by line 126, then the "valid" flip-flop should be set provided that the write_pointer is not equal to "1". If the write_pointer were equal to "1", that would indicate that there is only one data value in the FIFO, and so popping the FIFO then would result in the FIFO being empty, so the signal "valid" should in that case not be asserted. As indicated by line 128, if the FIFO is only being pushed and the FIFO is not already full, then a "1" value should be assigned to the signal "valid". Line 130 indicates how the signal "valid" should be driven if the FIFO is performing no operation (not both a push and pop, and not just a pop, and not just a push). As indicated by line 131, if the FIFO is not performing any operation, then the value of "valid" should not be changed.

Lines 134-142 indicate how the signal "full" should be generated. If the FIFO is being popped and pushed at the same time, if the FIFO has something in it as indicated by "valid" being true, and if the FIFO is not full as indicated by "full" being false, as indicated by line 134, then the value of "full" should not be changed, as indicated by line 135. Pushing and popping the FIFO at the same time does not change the number of data values stored, so pushing and popping the FIFO should not change the value of the "full" signal. Otherwise, if the FIFO is being popped and not pushed when the FIFO has something in it, as indicated by line 136, then the FIFO after the popping operation cannot be full. Accordingly, a value of "0" is loaded into the "full" flip-flop as indicated by line 137. Otherwise, if the FIFO is being pushed and is not being popped and if the FIFO is not full, as indicated by line 138, then if the write_pointer is equal to "4" then the full flip-flop should be set to "1" as indicated by line 139. If the write-pointer contains a value of four, then there are already four data values in the FIFO, so pushing the FIFO would result in five data values being in the FIFO and the FIFO would then be full. Otherwise, if the FIFO is not being pushed or popped, as indicated by line 140, then the value of "full" should not be changed, as indicated by line 141.

Lines 145-153 indicate how the value of "write_pointer" should be generated. If the FIFO is being popped and pushed at the same time, as indicated by line 145, then the number of data values stored in the FIFO is not changed and the value of write_pointer should not be changed, as indicated by line 146. Otherwise, if the FIFO is being popped, as indicated by line 147, then the value of the write-pointer should be decreased by one (decremented) as indicated by line 148. Otherwise, if the FIFO is being pushed and the FIFO is not full, as indicated by line 149, then the value of write_popinter should be increased by one (incremented) as indicated by line 150. Otherwise, if the FIFO is not being pushed or popped, as indicated by line 151, then the value of write_pointer should not be changed, because the number of data values stored in the FIFO is not being changed.

Lines 156-164 indicate how the signal "tail_valid" should be generated. If the FIFO is being popped when there is something in the FIFO, or if the FIFO is being pushed when the FIFO is not already full, as indicated by line 156, then the "tail_valid" signal is set to "1" as long as the write_ pointer is not equal to "1". If there is only one data value stored in the FIFO, then that data value is stored in the head register and the tail register is empty, so "tail_valid" should be "0". The write pointer indicates the number of data values stored in the FIFO, so if the write pointer were equal to "1" there would only be one data value in the FIFO, and that one data value would be stored in the head register, so the tail register would be empty, and the "tail_valid" signal should not be set. If, however, the FIFO is being popped and there is one data value stored in the FIFO as indicated by line 158, then after the popping operation there would be no data value in the tail register, and "tail_valid" should be set to "0", as indicated by line 159. Otherwise, if the FIFO is being pushed and the FIFO is not already full and there is at least one thing already in the FIFO, then there will be something stored in the tail register. Accordingly, as indicated by line 161, if "write_pointer" is not equal to zero, then the signal "tail_valid" is set. Otherwise, if the FIFO is not being pushed or popped, as indicated by line 162, then the value of "tail_valid" should not be changed.

Lines 166-173 indicate how the internal write pointer register "wp" should be loaded. If there is something in the tail register and the FIFO is not full, and if the FIFO is not being popped with exactly two data values in the FIFO, as indicated in line 166, then the value "wp" should be incremented. Lines 167-170 define how the incrementing of the value "wp" occurs. If the value of "wp" is "3", as indicated in line 167, then the incrementing of the value "wp" should result in the value "wp" rolling over to a value of "1" as indicated in line 168. Otherwise, if the value if "wp" is not "3", then the value of "wp" should be incremented by one as indicated in line 170. If the FIFO is not being either pushed or popped, as indicated in line 172, then the value of "wp" should not be changed, as indicated in line 173.

Lines 176-184 indicate how the internal read pointer register "rp" should be loaded. If the FIFO is being popped (unless there are only two entries in the FIFO) as indicated in line 176, then the next pop should result in a read from one of the internal registers A, B or C. Accordingly, due to the read of one of the internal registers, the value "rp" should be incremented. Lines 177-181 define the incrementing of the value "rp". If the value of "rp" is "3", as indicated in line 177, then the incrementing of the value "rp" should result in the value "rp" rolling over to a value of "1" as indicated in line 178. Otherwise, if the value if "rp" is not "3", then the value of "rp" should be incremented by one as indicated in line 180. If the FIFO is not being either pushed or popped, as indicated in line 182, then the value of "rp" should not be changed, as indicated in line 183.

Lines 186-204 indicate how the head register (fifo_array[0]) should be loaded. If the FIFO is being popped and pushed at the same time (as indicated by line 186), and if there is only one data value in the FIFO as indicated by line 187, then that data value is in the head register and the incoming new data value (write_data) should be loaded into the head register (fifo_array[0]) as indicated by line 188, otherwise if there are two data values in the FIFO as indicated by line 189, then the value in the tail register (fifo_array[4]) should be loaded into the head register as indicated by line 190, otherwise if the FIFO is being pushed and popped and the number of data values in the FIFO is neither one nor two, as indicated by line 191, then the popping operation should result in the data value stored in the internal register pointed to by the "rp" pointer value should be loaded into the head register, as indicated by line 192. If the FIFO is being popped and not pushed (as indicated by line 194), and if there is a data value in the tail and the number of data values stored in the FIFO is two, then the data value in the tail register (fifo_array[4]) should be loaded into the head register as indicated by line 196, otherwise if the number of data values stored in the FIFO is not one (as indicated by line 197), then the data value stored in the internal register pointed to by the "rp" pointer value should be loaded into the head register, as indicated by line 198. If the FIFO is being pushed and not popped (as indicated by line 200), and if there is no data value stored in the FIFO (as indicated by line 201), then the incoming new data value (write_data) should be loaded into the head register, as indicated by line 202. Implicitly, under all other conditions, the head register value remains unchanged.

Lines 207-215 indicate how the tail register (fifo-array[4]) should be loaded. If the FIFO is being pushed and popped at the same time (as indicated by line 207), and if the number of data values in the FIFO is not one (as indicated by line 208), then the incoming new data value (write_data) should be loaded into the tail register, as indicated by line 209. If the FIFO is being pushed and not popped (as indicated by line 211), and if the number of data values stored is not zero (as indicated by line 212), then the incoming new data value (write_data) should be loaded into the tail register, as indicated by line 213. Implicitly, under all other conditions, the head register value remains unchanged.

Lines 218-219 indicate how the internal registers A, B and C (fifo_array[1], fifo_array[2] and fifo_array[3]) should be loaded. If the tail register contains a data value and the FIFO is not full (as indicated by line 218), then the data value in the tail register should be loaded into the one of the internal registers that is pointed to by the internal write pointer value "wp", as indicated line 219.

A commercially available hardware synthesis program (such as Design Compiler by Synopsis) is utilized to realize a hardware circuit from the functional description of FIG. 8.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A FIFO (First In First Out) memory, comprising:
   a tail register;
   a plurality of internal registers;
   a head register;
   a set of input data leads;
   a set of output data leads;
   a clock signal input lead, wherein a clock signal is received onto the clock signal input lead;
   a push signal input lead;
   a pop signal input lead;
   a full signal output lead;
   a valid signal output lead; and
   means for controlling the tail register, the internal registers, and the head register such that:
   1) an incoming data value that is pushed into the FIFO memory from the set of input data leads can only be written directly into either the head register or the tail register and can never be written directly from the set of input data leads into any of the internal registers;

2) only a data value stored in the head register is ever output from the FIFO memory onto the set of output data leads;

3) if during a clock cycle the tail register stores a data value and at least one of the internal registers is empty and no push operation is to be performed by the FIFO memory in the next clock cycle and no pop operation is to be performed by the FIFO memory in the next clock cycle then in the next clock cycle the data value stored in the tail register is loaded into an empty one of the internal registers;

4) an incoming data value on the set of input data leads is captured into the FIFO memory on a rising edge of the clock signal if a push signal on the push signal input lead is asserted at the time of the rising edge provided that a full signal on the full signal output lead is not asserted at the time of the rising edge; and 5) if the FIFO memory is empty in one clock cycle and if the FIFO memory then performs a push operation in the next clock cycle then an incoming data value from the set of input data leads is written directly into the head register in said next clock cycle.

2. The FIFO memory of claim 1, wherein the means comprises:
   a full flip-flop, wherein a data output lead of the full flip-flop is coupled to the full signal output lead of the FIFO memory;
   a valid flip-flop, wherein a data output lead of the valid flip-flop is coupled to the valid signal output lead of the FIFO memory; and
   a write pointer register that stores a multi-bit value, wherein the multi-bit value indicates how many of the registers of the FIFO are storing data values.

3. The FIFO memory of claim 2, wherein the means further comprises:
   a tail valid flip-flop, wherein a data content of the tail valid flip-flop indicates whether the tail register is storing a data value.

4. The FIFO memory of claim 3, wherein the means further comprises:
   an internal write pointer register, wherein the internal write pointer register stores a multi-bit value that indicates a next internal register into which a data value will be written; and
   an internal read pointer register, wherein the internal read pointer register stores a multi-bit value that indicates a next internal register from which a data value will be transferred into the head register.

5. The FIFO memory of claim 3, wherein the means further comprises:
   multiplexing circuitry that has a set of data output leads, wherein the set of data output leads of the multiplexing circuitry is coupled to data input leads of the head register.

6. The FIFO memory of claim 5, wherein the multiplexing circuitry also has a first set of data input leads, and a second set of data input leads, and a third set of data input leads, wherein the first set of data input leads of the multiplexing circuitry is coupled to receive data values from the set of input data leads of the FIFO memory, wherein the second set of data input leads of the multiplexing circuitry is coupled to data output leads of the tail register, and wherein the third set of data input leads of the multiplexing circuitry is coupled to data output leads of one of the internal registers.

7. The FIFO memory of claim 6, wherein the means further comprises:
   first clock signal gating circuitry, wherein the tail register has a clock signal input lead, and wherein the first clock signal gating circuitry supplies a first signal onto the clock signal input lead of the tail register;
   second clock signal gating circuitry, wherein the head register has a clock signal input lead, and wherein the second clock signal gating circuitry supplies a second signal onto the clock signal input lead of the head register; and
   third clock signal gating circuitry, wherein one of the internal registers has a clock signal input lead, and wherein the third clock signal gating circuitry supplies a third signal onto the clock signal input lead of said one of the internal registers.

8. The FIFO memory of claim 1, wherein the means is also for supplying a full signal onto the full signal output lead, wherein the full signal is asserted if all the registers of the FIFO memory are storing valid data values.

9. The FIFO memory of claim 1, wherein the means is also for supplying a valid signal onto the valid signal output lead, wherein the valid signal is asserted if the head register is storing a valid data value.

10. The FIFO memory of claim 1, wherein the means is also for receiving a push signal from the push signal input lead of the FIFO memory.

11. The FIFO memory of claim 1, wherein the means is also for receiving a pop signal from the pop signal input lead of the FIFO memory.

12. The FIFO memory of claim 1, wherein the means is also for controlling the tail register, the internal registers, and the head register such that:
   6) a data value can be simultaneously pushed into the FIFO memory at the same time that the FIFO memory is popped on a rising edge of the clock signal provided that a valid signal on the valid signal output lead is asserted at the time of the rising edge and provided that a full signal on the full signal output lead is not asserted at the time of the rising edge.

13. The FIFO memory of claim 1, wherein the means is also for controlling the tail register, the internal registers, and the head register such that:
   6) a data value can be simultaneously pushed into the FIFO memory at the same time that the FIFO memory is popped.

14. The FIFO memory of claim 1, wherein each of the internal registers has a set of data input leads, and wherein a set of data output leads of the tail register is coupled in parallel to the set of data input leads of each of the internal registers.

15. A registered synchronous FIFO (First In First Out) memory device, comprising:
   a tail register;
   a plurality of internal registers;
   a head register; and
   means for controlling the tail register, the internal registers, and the head register such that: 1) an incoming data value being loaded into the FIFO memory device can only be loaded directly into either the tail register or the head register; 2) if a data value is stored in the tail register and if one of the internal registers is empty and the FIFO is neither to be pushed nor popped during the next clock cycle, then the data value is nevertheless transferred from the head register to the empty internal register during the next clock cycle; and 3) a data value cannot be pushed into the FIFO memory device if the FIFO memory device is full and the FIFO memory device cannot be popped if the FIFO memory device is empty, but otherwise the FIFO memory device can be pushed and/or popped.

16. The registered synchronous FIFO memory device of claim 15, wherein the means comprises:
   a full flip-flop, wherein a data content of the full flip-flop indicates whether the FIFO memory device is full;
   a valid flip-flop, wherein a data content of the valid flip-flop indicates whether the FIFO memory device is not empty;
   a tail valid flip-flop, wherein a data content of the tail valid flip-flop indicates whether the tail register is not empty;
   a write pointer register that stores a multi-bit value, wherein the multi-bit value indicates how many of the registers of the FIFO are not empty;
   an internal write pointer register, wherein the internal write pointer register stores a multi-bit value that indicates a next internal register into which a data value will be written;
   an internal read pointer register, wherein the internal read pointer register stores a multi-bit value that indicates a next internal register from which a data value will be transferred into the head register; and
   multiplexing circuitry that has a set of data output leads, wherein the set of data output leads of the multiplexing circuitry is coupled to data input leads of the head register, wherein the multiplexing circuitry also has a first set of data input leads, and a second set of data input leads, and a third set of data input leads, wherein the first set of data input leads of the multiplexing circuitry is coupled to receive data values received into the FIFO memory device from a set of input data leads of the FIFO memory device, wherein the second set of data input leads of the multiplexing circuitry is coupled to data output leads of the tail register, and wherein the third set of data input leads of the multiplexing circuitry is coupled to data output leads of one of the internal registers.

17. The registered synchronous FIFO memory device of claim 16, further comprising:
   a push signal input lead, wherein a digital logic value of a push signal present on the push signal input lead does not affect whether any one of the internal registers is loaded with a data value in any given clock cycle.

18. The registered synchronous FIFO memory device of claim 17, further comprising:
   a set of output data leads, wherein the FIFO memory device includes no multiplexer that supplies data values onto the set of output data leads, and wherein the head register is directly coupled to the set of output data leads.

19. A registered synchronous FIFO (First In First Out) memory device, comprising:
   a tail register;
   a plurality of internal registers;
   a head register; and
   a synchronous digital logic control circuit that controls the tail register, the internal registers, and the head register such that: 1) an incoming data value being loaded into the FIFO memory device can only be loaded directly into either the tail register or the head register; 2) if a data value is stored in the tail register and if one of the internal registers is empty and the FIFO is neither to be pushed nor popped during the next clock cycle, then the data value is nevertheless transferred from the head register to the empty internal register during the next clock cycle; and 3) a data value cannot be pushed into the FIFO memory device if the FIFO memory device is full and the FIFO memory device cannot be popped if the FIFO memory device is empty, but otherwise the FIFO memory device can be pushed and/or popped, wherein the synchronous digital logic control circuit comprises:
   a full flip-flop, wherein a data content of the full flip-flop indicates whether the FIFO memory device is full;
   a valid flip-flop, wherein a data content of the valid flip-flop indicates whether the FIFO memory device is not empty;
   a tail valid flip-flop, wherein a data content of the tail valid flip-flop indicates whether the tail register is not empty;
   a write pointer register that stores a multi-bit value, wherein the multi-bit value indicates how many of the registers of the FIFO are not empty;
   an internal write pointer register, wherein the internal write pointer register stores a multi-bit value that indicates a next internal register into which a data value will be written;
   an internal read pointer register, wherein the internal read pointer register stores a multi-bit value that indicates a next internal register from which a data value will be transferred into the head register; and
   multiplexing circuitry that has a set of data output leads, wherein the set of data output leads of the multiplexing circuitry is coupled to data input leads of the head register, wherein the multiplexing circuitry also has a first set of data input leads, and a second set of data input leads, and a third set of data input leads, wherein the first set of data input leads of the multiplexing circuitry is coupled directly to a set of data input leads of the FIFO memory device, wherein the second set of data input leads of the multiplexing circuitry is coupled to data output leads of the tail register, and wherein the third set of data input leads of the multiplexing circuitry is coupled to data output leads of one of the internal registers.

20. The registered synchronous FIFO memory device of claim 19, further comprising:
   a clock signal input lead, wherein a clock signal is received onto the FIFO memory device via the clock signal input lead, wherein each of the internal registers has a clock signal input lead, and wherein the synchronous digital logic control circuit gates the clock signal and supplies a gated clock signal onto the clock signal input lead of each internal register.

\* \* \* \* \*